United States Patent
Lee et al.

(10) Patent No.: US 10,687,275 B2
(45) Date of Patent: Jun. 16, 2020

(54) METHOD FOR CAPABILITY NEGOTIATION AND SLICE INFORMATION MAPPING BETWEEN NETWORK AND TERMINAL IN 5G SYSTEM

(71) Applicant: Samsung Electronics Co., Ltd., Gyeonggi-do (KR)

(72) Inventors: Hoyeon Lee, Seoul (KR); Sunghoon Kim, Seoul (KR); Jungje Son, Gyeonggi-do (KR)

(73) Assignee: Samsung Electronics Co., Ltd. (KR)

(*) Notice: Subject to any disclaimer, the term of this patent is extended or adjusted under 35 U.S.C. 154(b) by 0 days.

(21) Appl. No.: 16/103,537

(22) Filed: Aug. 14, 2018

(65) Prior Publication Data

US 2019/0053148 A1 Feb. 14, 2019

(30) Foreign Application Priority Data

Aug. 14, 2017 (KR) .......................... 10-2017-0103089

(51) Int. Cl.
*H04W 48/18* (2009.01)
*H04W 48/08* (2009.01)
(Continued)

(52) U.S. Cl.
CPC ............. *H04W 48/18* (2013.01); *H04W 8/12* (2013.01); *H04W 48/08* (2013.01); *H04W 8/02* (2013.01); *H04W 60/00* (2013.01); *H04W 84/042* (2013.01)

(58) Field of Classification Search
CPC ..... H04W 48/18; H04W 48/08; H04W 60/00; H04W 84/042; H04W 8/02
See application file for complete search history.

(56) References Cited

U.S. PATENT DOCUMENTS 10,257,690 B2 * 4/2019 Neal ....................... H04W 8/12
10,425,987 B2 * 9/2019 Yang ....................... H04W 8/08

FOREIGN PATENT DOCUMENTS

WO    WO 2017/135860    8/2017

OTHER PUBLICATIONS

Zte et al., "23.501 P-CR: Network Slicing Update for Supporting Standalone NSSF", S2-174249, SA WG2 Meeting #122, Jun. 25-30, 2017, 15 pages.

(Continued)

*Primary Examiner* — Mohammad S Anwar
(74) *Attorney, Agent, or Firm* — The Farrell Law Firm, P.C.

(57) ABSTRACT

Provided are a communication method and system that combine the 5G communication system with IoT technology to support a data rate higher than that of the 4G system. The present disclosure is based on 5G communication technology and IoT related technology and can be applied to intelligent services (e.g., smart home, smart building, smart city, smart or connected car, health care, digital education, retail business, security, and safety related services). A method is provided that enables the terminal and the 5G network to check each other's capability information to achieve interworking between network slices defined differently by different mobile network operators. The method for providing network slice information of a visited public land mobile network (VPLMN) in a wireless communication system includes generating mapping information by mapping first slice information for a visited public land mobile network (HPLMN) of a user equipment (UE) and second slice information for the VPLMN connected to the UE when roaming, and transmitting, to the UE, information corresponding to a slice requested by the UE, the information selected based on the mapping information.

14 Claims, 18 Drawing Sheets

(51) Int. Cl.
H04W 8/12      (2009.01)
H04W 60/00     (2009.01)
H04W 84/04     (2009.01)
H04W 8/02      (2009.01)

(56) References Cited

OTHER PUBLICATIONS

Telecom Italia et al., "Network Slicing Support for Roaming", S2-174253, SA WG2 Meeting #122, Jun. 25-30, 2017, 2 pages.
Ericsson, "NSSF and Slice Selection During the Registration Procedures", S2-174202, SA WG2 Meeting #122, Jun. 26-30, 2017, 11 pages.
3GPP, 3rd Generation Partnership Project; Technical Specification Group Services and System Aspects; System Architecture for the 5G System; Stage 2 (Release 15), 3GPP TS 23.501 V1.2.0, Jul. 2017, 166 pages.
International Search Report dated Nov. 20, 2018 issued in counterpart application No. PCT/KR2018/009333, 4 pages.
Samsung, SK Telecom, "TS 23.501: PLMN-specific NSSAI", S2-171891, SA WG2 Meeting #120, Mar. 27-31, 2017, 5 pages.
Ericsson, "Is UE AS Slice Agnostic or Not?", R2-1702554, 3GPP TSG-RAN WG2 #97bis, Apr. 3-7, 2017, 5 pages
European Search Report dated Feb. 11, 2020 issued in counterpart application No. 18846643.7-1212, 10 pages.

* cited by examiner

FIG. 2

| PLMN | roaming agreement (hS-NSSAI) | mapped slice (vS-NSSAI) | |
|---|---|---|---|
| PLMN A | PLMNA_S-NSSAI#1 | S-NSSAI#a | ~240 |
| PLMN A | PLMNA_S-NSSAI#2 | S-NSSAI#b | ~250 |
| PLMN A | PLMNA_S-NSSAI#3 | S-NSSAI#c | ~260 |
| PLMN A | PLMNA_S-NSSAI#4 | S-NSSAI#c | ~270 |
| PLMN B | PLMNB_S-NSSAI#1 | S-NSSAI#a | ~280 |
| PLMN B | PLMNB_S-NSSAI#2 | S-NSSAI#a | |
| PLMN B | PLMNB_S-NSSAI#3 | S-NSSAI#b | |
| PLMN C | PLMNC_S-NSSAI#1 | S-NSSAI#c | ~290 |
| PLMN B & PLMN C | PLMNBC_S-NSSAI#1 | S-NSSAI#b | ~295 |
| PLMN B & PLMN C | PLMNBC_S-NSSAI#2 | S-NSSAI#d | |

| PLMN | roaming agreement (hS-NSSAI) | mapped slice (vS-NSSAI) | |
|---|---|---|---|
| PLMN A | PLMNA_S-NSSAI#1 | | ~340 |
| PLMN A | PLMNA_S-NSSAI#2 | | ~350 |
| PLMN A | PLMNA_S-NSSAI#3 | | ~360 |
| PLMN A | PLMNA_S-NSSAI#4 | | ~370 |
| PLMN A | PLMNA_S-NSSAI#5 | | ~375 |
| PLMN B | PLMNA_S-NSSAI#1 | PLMNB_S-NSSAI#1 | |
| PLMN B | PLMNA_S-NSSAI#2 | PLMNB_S-NSSAI#2 | |
| PLMN C | PLMNA_S-NSSAI#1 | PLMNC_S-NSSAI#1 | |
| PLMN B & PLMN C | PLMNA_S-NSSAI#4 | PLMNBC_S-NSSAI#1 | |
| PLMN V | PLMNA_S-NSSAI#1 | S-NSSAI#a | ~380 |
| PLMN V | PLMNA_S-NSSAI#2 | S-NSSAI#b | ~385 |
| PLMN V | PLMNA_S-NSSAI#3 | S-NSSAI#c | ~390 |
| PLMN V | PLMNA_S-NSSAI#4 | S-NSSAI#c | ~395 |

310   320   330

METHOD FOR CAPABILITY NEGOTIATION AND SLICE INFORMATION MAPPING BETWEEN NETWORK AND TERMINAL IN 5G SYSTEM

CROSS-REFERENCE TO RELATED APPLICATION(S)

This application is based on and claims priority under 35 U.S.C. § 119(a) to Korean Patent Application No. 10-2017-0103089, filed on Aug. 14, 2017, in the Korean Intellectual Property Office, the disclosure of which is incorporated by reference herein in its entirety.

BACKGROUND

1. Field

The present disclosure relates generally to a method and an apparatus that can check capability information of a terminal and a 5G network to enable interworking between network slices defined differently for different mobile network operators and more particularly, to a method and an apparatus that enables a user equipment (UE) and a 5G network to check each other's capability information.

2. Description of Related Art

Since commercial deployment of 4G communication systems, to meet the ever increasing demand for wireless data traffic, efforts have been made to develop improved 5G or pre-5G communication systems. As such, 5G or pre-5G communication systems are also called "beyond 4G network" or "post LTE system". To achieve higher data rates, 5G communication systems consider utilization of the millimeter wave (mmWave) band (e.g., 60 GHz band). To decrease path loss and increase transmission distance in the mmWave band, various technologies including beamforming, massive multiple-input multiple-output (massive MIMO), full dimensional MIMO (FD-MIMO), array antennas, analog beamforming, and large scale antennas are considered for 5G communication systems. To improve system networks in 5G communication systems, technology development is under way regarding evolved small cells, advanced small cells, cloud radio access networks (cloud RANs), ultra-dense networks, device-to-device (D2D) communication, wireless backhaul, moving networks, cooperative communication, coordinated multi-points (CoMP), reception interference cancellation, and the like. In addition, advanced coding and modulation (ACM) schemes such as hybrid frequency shift keying (FSK) and quadrature amplitude modulation (QAM) modulation (FQAM) and sliding window superposition coding (SWSC), and advanced access technologies such as filter bank multi carrier (FBMC), non-orthogonal multiple access (NOMA), and sparse code multiple access (SCMA) are also under development for 5G communication systems.

In addition, the Internet is evolving into the Internet of things (IoT) where distributed elements or things process and exchange information. There has also emerged the Internet of everything (IoE) technology that combines IoT technology with big data processing technology through connection with cloud servers. To realize IoT services, base technologies such as sensing, wired/wireless communication and network infrastructure, service interfacing and security are needed, and technologies interconnecting things such as sensor networks, machine-to-machine (M2M) or machine type communication (MTC) are under development. In IoT environments, it is possible to provide intelligent Internet technology services, which collect and analyze data created by interconnected things to add new value to life. Through convergence and combination between existing information technologies and various field technologies, IoT technology may be applied to various areas such as smart homes, smart buildings, smart cities, smart or connected cars, smart grids, health-care, smart consumer electronics, and advanced medical services.

Accordingly, various attempts are being made to apply 5G communication systems to IoT networks. For example, sensor networks and M2M or MTC are being realized by use of 5G communication technologies including beamforming, MIMO and array antennas. Application of cloud RANs to big data processing described above may be an instance of convergence of 5G communication technology and IoT technology.

In addition, in order for a 5G network to provide a network slicing function to a UE, it is necessary for both the 5G network and the UE to implement and provide the network slicing function. In this case, since the implementation of the slicing function of the 5G network is not mandatory, a method and an apparatus are needed that enable interworking between slices defined differently for different mobile network operators.

The third generation partnership project (3GPP) is in the process of standardization for the 5G RAN and 5G core network (CN). The main feature of the 5G network is network slices.

In order for the 5G network to provide the network slicing function to the UE, it is necessary for both the 5G network and the UE to implement and provide the network slicing function. However, the standards do not enforce implementation of the network slicing function of the 5G network and UE. Hence, there is a need for a method that can provide a mobile communication service without causing an error when the 5G network provides the network slicing function but the UE does not, or when the UE provides the network slicing function but the 5G network does not.

In addition, since implementation of the slicing function of the 5G network is not mandatory, each mobile network operator may choose whether to provide the slicing function in their 5G network. In addition, different mobile network operators may define and provide different network slicing functions. Thus, when mobile network operators define and use non-standard network slices, a method is needed that can provide a network slice service to a roaming UE.

SUMMARY

An aspect of the present disclosure provides a method that enables a UE and a 5G network to check each other's capability information and a method that enables interworking between network slices defined differently by different mobile network operators.

Another aspect of the present disclosure provides a UE and a 5G network that may check each other's capability information and operate accordingly, making it possible to provide a mobile communication service without an error.

Another aspect of the present disclosure provides a method that enables interworking between network slices defined differently by different mobile network operators, making it possible to provide a roaming service.

In accordance with an aspect of the present disclosure, there is provided a method for providing network slice information of a visited public land mobile network (VPLMN) in a wireless communication system. The method includes generating mapping information by mapping first slice information for a home public land mobile network (HPLMN) of a UE and second slice information for the VPLMN connected to the UE when roaming; and transmitting, to the UE, information corresponding to a slice requested by the UE, wherein the information is selected based on the mapping information.

In accordance with another aspect of the present disclosure, there is provided a method for receiving network slice information of a UE when roaming in a wireless communication system. The method includes transmitting, to a VPLMN connected to the UE when roaming, slice information requested by UE; and receiving, from the VPLMN, information corresponding to the slice information requested by UE, the information selected based on mapping information generated by mapping first slice information for an HPLMN of the UE and second slice information for the VPLMN.

In accordance with another aspect of the present disclosure, there is provided a VPLMN for providing network slice information in a wireless communication system. The VPLMN includes a transceiver; and a controller coupled with the transceiver and configured to control to generate mapping information by mapping first slice information for an HPLMN of a UE and second slice information for the VPLMN connected to the UE when roaming, and transmit, to the UE, information corresponding to a slice requested by the UE, wherein the information is selected based on the mapping information. In accordance with another aspect of the present disclosure, there is provided a UE for receiving network slice information when roaming in a wireless communication system. The UE includes a transceiver; and a controller coupled with the transceiver and configured to control to transmit, to a VPLMN connected to the UE when roaming, slice information requested by the UE, and receive, from the VPLMN, information corresponding to the slice information requested by the UE, wherein the information selected is based on mapping information generated by mapping first slice information for an HPLMN of the UE and second slice information for the VPLMN,

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2 illustrates network slice information stored in a VPLMN for roaming support according to an embodiment;

FIG. 3 illustrates network slice information stored in a UE or an HPLMN for roaming support according to an embodiment;

DETAILED DESCRIPTION

Figure 1:
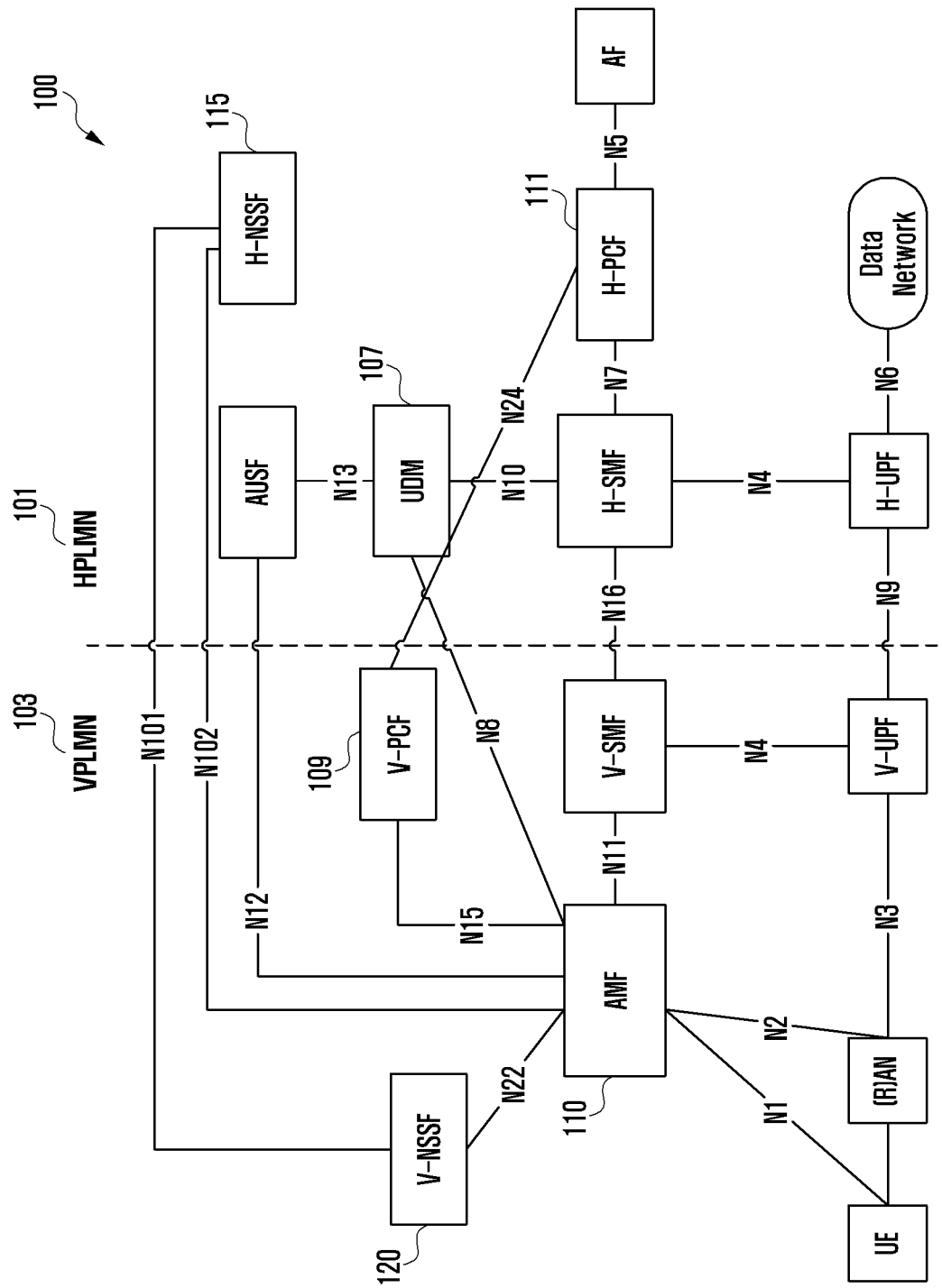
FIG. 1 is a block diagram of a 5G core network for roaming support according to an embodiment.

Hereinafter, embodiments of the present disclosure are described in detail with reference to the accompanying drawings. The same or similar reference symbols are used throughout the accompanying drawings to refer to the same or like parts. Detailed descriptions of well-known functions and structures incorporated herein are omitted to avoid obscuring the subject matter of the present disclosure.

Descriptions of functions and structures well known in the art and not directly related to the present disclosure are also omitted for clarity and conciseness without obscuring the subject matter of the present disclosure.

In the accompanying drawings, some elements are exaggerated, omitted, or only outlined in brief, and thus may be not drawn to scale. The same or similar reference symbols are used throughout the drawings to refer to the same or like parts.

The aspects, features and advantages of certain embodiments of the present disclosure will be more apparent from the following detailed description taken in conjunction with the accompanying drawings. The description of the various embodiments is to be construed as exemplary only and does not describe every possible instance of the present disclosure. It should be apparent to those skilled in the art that the following description of various embodiments of the present disclosure is provided for illustration purpose only and is not intended to limit the present disclosure as defined by the appended claims and their equivalents. The same reference symbols are used throughout the description to refer to the same parts.

In the embodiments of the present disclosure, the elements included in the disclosure are expressed in a singular or plural form according to the proposed certain embodiment. However, the singular or plural expression is appropriately selected for ease of description according to the presented situation, and the present disclosure is not intended to be limited to a single element or plural elements. Those elements described in a plural form may be configured as a single element, and those elements described in a singular form may be configured as plural elements.

In the following description, the terms identifying an access node, a network entity, a message, an interface between network entities, and various identification information are used for ease of description. Hence, the present disclosure is not intended to be limited to the following terms, and other terms referring to entities or objects having an equivalent technical meaning may be used.

In the following description of the present disclosure, terms and names defined in the standard for the 5G system are used. However, the present disclosure is not limited by those terms and names, but may also be applied to systems conforming to other standards.

That is, the following description of embodiments of the present disclosure is focused on a system conforming to the 3GPP communication standards. However, it should be understood by those skilled in the art that the subject matter of the present disclosure is applicable to other communication systems having similar technical backgrounds without significant modifications departing from the scope of the present disclosure. In addition, non-3GPP access may be applied to other forms of access including wireless fidelity (WiFi) access except for 5G access.

In the following description of embodiments, the terms "slice", "service", "network slice", "network service", "application slice", and "application service" may be used interchangeably.

First Embodiment

FIG. 1 is a block diagram of a system architecture 100 of a 5G core network for roaming support according to an embodiment.

Referring to FIG. 1, an HPLMN 101 indicates a mobile network operator to which a terminal (or UE) subscribes. A VPLMN 103 indicates a mobile network operator that the terminal accesses at a time of roaming. In this case, it is assumed that a roaming agreement exists between the HPLMN 101 and the VPLMN 103.

To provide a mobile communication service to the terminal connected to the VPLMN 103, an access and mobility function (AMF) 105 of the VPLMN 103 may fetch the terminal subscription data (e.g., UE subscription information) from a unified data management (UDM) 107 of the HPLMN 101.

A visiting policy control function (V-PCF) 109 may fetch policy information from a home PCF (H-PCF) 111, and the AMF 105 may receive the policy information from the V-PCF 109.

The AMF 105 may fetch network slice information from a visiting network slice selection function (V-NSSF) 113 or a home NSSF (H-NSSF) 115. The V-NSSF 113 and the H-NSSF 115 may exchange slice information through communication.

FIG. 2 illustrates network slice information stored in a VPLMN according to an embodiment.

More specifically, the corresponding information may be stored in the V-NSSF 120 or the AMF 110 of the VPLMN 103. The VPLMN 103 may establish a roaming agreement with plural mobile network operators. The VPLMN 103 may provide a mobile communication service to a terminal having a subscription to the mobile network operator having a roaming agreement with the VPLMN 103 when the terminal roams to the VPLMN 103.

Referring to FIG. 2, PLMN 210 indicates a mobile network operator with which the VPLMN 103 has a roaming agreement. For example, the VPLMN 103 has a roaming agreement with PLMN A, PLMN B, and PLMN C.

The roaming agreement 220 may include slice information (hS-NSSAI) of the PLMN 210 (e.g., HPLMN 101) to be provided by the VPLMN 103. For example, the VPLMN 103 has a roaming agreement with PLMN A to support four slices of PLMN A, i.e., PLMNA_S-NSSAI#1, PLMNA_S-NSSAI#2, PLMNA_S-NSSAI#3, and PLMNA_S-NSSAI#4. The VPLMN 103 has a roaming agreement with PLMN B to support five slices of PLMN B, i.e., PLMNB_S-NSSAI#1, PLMNB_S-NSSAI#2, PLMNB_S-NSSAI#3, PLMNBC_S-NSSAI#1, and PLMNBC_S-NSSAI#2. The VPLMN 103 has a roaming agreement with PLMN C to support three slices of PLMN C, i.e., PLMNC_S-NSSAI#1, PLMNBC_S-NSSAI#1, and PLMNBC_S-NSSAI#2.

In addition, the VPLMN 103 may store slice information 230 of the VPLMN 103 that is mapped to the slice information 220 included in the roaming agreement. One slice (hS-NSSAI) of a mobile network operator having a roaming agreement with the VPLMN 103 may be mapped to one slice (vS-NSSAI) of the VPLMN 103. For example, PLMNA_S-NSSAI#1 of PLMN A may be mapped to S-NSSAI#a 240, and PLMNA_S-NSSAI#2 may be mapped to S-NSSAI#b 250. Multiple slices (hS-NSSAI) of a mobile network operator having a roaming agreement with the VPLMN 103 can be mapped to one slice (vS-NSSAI) of the VPLMN 103. For example, PLMNA_S-NSSAI#3 and PLMNA_S-NSSAI#4 of PLMN A may be mapped to S-NSSAI#c 260 or 270. Slices (hS-NSSAI) of different mobile network operators may be mapped to one slice (vS-NSSAI) of the VPLMN 103. For example, PLMNA_S-NSSAI#1 of PLMN A and PLMNB_S-NSSAI#1 of PLMN B may be mapped to S-NSSAI#a 240 or 280. In addition, different mobile network operators can use the same slice value (hS-NSSAI). For example, PLMN B and PLMN C may use the same value of PLMNBC_S-NSSAI#1 295 through an agreement between them. Hence, the VPLMN 103 may map PLMNBC_S-NSSAI#1 used by PLMN B and PLMN C to one slice S-NSSAI#b.

In addition, the VPLMN 103 may change or update the slice information to be used for a roaming terminal. For example, according to the network slice information for roaming support in FIG. 2, S-NSSAI#c of VPLMN 103 is used for PLMNA_S-NSSAI#3 and PLMNA_S-NSSAI#4 of PLMN A and PLMNC_S-NSSAI#1 of PLMN C (260, 270, and 290). The VPLMN 103 may change the currently used slice value from S-NSSAI#c to S-NSSAI#e owing to a network operation policy change, a network deployment change, a roaming agreement change, and the like. That is, the slice supporting PLMNA_S-NSSAI#3 and PLMNA_S-NSSAI#4 of PLMN A and PLMNC_S-NSSAI#1 of PLMN C may be changed from S-NSSAI#c to S-NSSAI#e and the corresponding information stored in the VPLMN 103 may be updated. Information on the vS-NSSAI change can be stored only in the V-NSSF 120 or the AMF 110 of the VPLMN 103, and the V-NSSF 120 or the AMF 110 may notify this to the H-NSSF 130 of the HPLMN 101.

FIG. 3 illustrates network slice information stored in the terminal (UE) according to an embodiment. This information may be referred to as configured NSSAI network slice selection assistance information (NSSAI) stored in the UE.

For example, the terminal has subscribed to PLMN A. That is, the HPLMN 101 of the terminal is PLMN A, and the terminal may receive a service from the five slices provided by the PLMN A, i.e., PLMNA_S-NSSAI#1 340, PLMNA_S-NSSAI#2 350, PLMNA_S-NSSAI#3 360, PLMNA_S-NSSAI#4 370, and PLMNA_S-NSSAI#5 375. When the slice information is needed in the registration procedure and the PDU session establishment procedure to access the HPLMN 101 (PLMN A), the terminal may use values PLMNA_S-NSSAI#1 340, PLMNA_S-NSSAI#2 350, PLMNA_S-NSSAI#3 360, PLMNA_S-NSSAI#4 370, and PLMNA_S-NSSAI#5 375 based on the information illustrated in FIG. 3.

When roaming, the terminal may include slice information to be used in the corresponding VPLMN 103. The terminal may examine the vS-NSSAI information of the VPLMN 103 (PLMN B, PLMN C, and PLMN V) to be used in place of the hS-NSSAI information based on the slice information of FIG. 3. For example, when the terminal connects to PLMN V, the terminal may use S-NSSAI#a 380 being the vS-NSSAI information of the VPLMN 103 (PLMN V) instead of PLMNA_S-NSSAI#1 being the hS-NSSAI information of the HPLMN 101 (PLMN A). The terminal may use S-NSSAI#b 385 being the vS-NSSAI information of the VPLMN 103 (PLMN V) instead of PLMNA_S-NSSAI#2 being the hS-NSSAI information of the HPLMN 101 (PLMN A). The terminal may use S-NSSAI#c 390 being the vS-NSSAI information of the VPLMN 103 (PLMN V) instead of PLMNA_S-NSSAI#3 being the hS-NSSAI information of the HPLMN 101 (PLMN A). The terminal may use S-NSSAI#c 395 being the vS-NSSAI information of the VPLMN 103 (PLMN V) instead of PLMNA_S-NSSAI#4 being the hS-NSSAI information of the HPLMN 101 (PLMN A).

Figure 4:
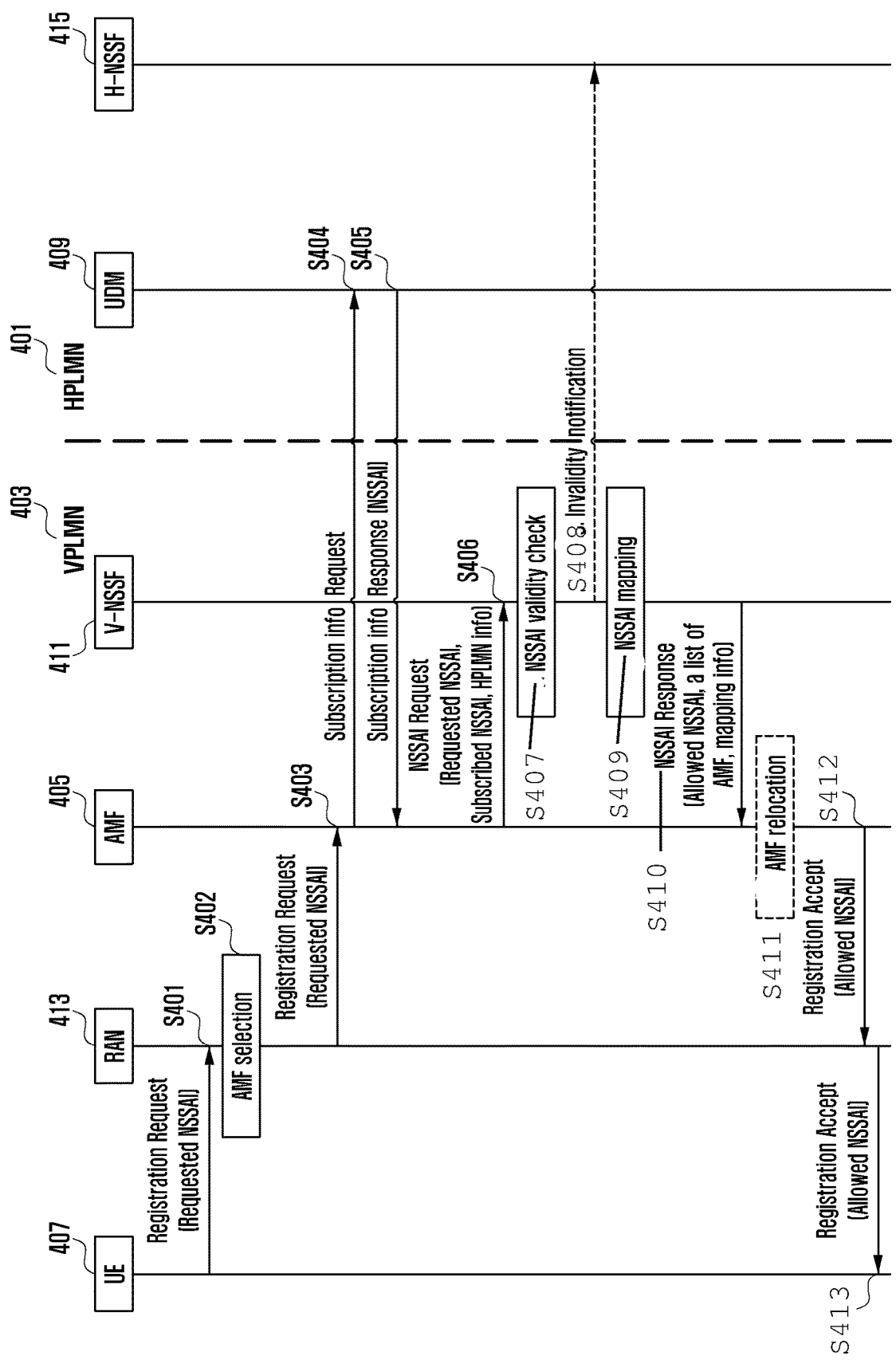
FIG. 4 is a flow diagram of a registration procedure of a UE at a time of roaming according to an embodiment.

FIG. 4 is a flow diagram of a registration procedure of a terminal at a time of roaming according to an embodiment. For ease of description, it is assumed that the HPLMN 401 of the terminal is PLMN A and the VPLMN 403 to which the terminal is currently connected is PLMN V.

Referring to FIG. 4, a registration request message is transmitted by the terminal to the VPLMN 403 in step S401. RAN 413 of VPLMN performs AMF selection in step S402.

An AMF 405 of the VPLMN 403 may receive the registration request message from the terminal in step S403. The AMF 405 may determine whether the terminal is a roaming terminal. To determine whether a UE 407 is a roaming UE, the AMF 405 may use the terminal identification (ID) information included in the registration request message. The terminal ID information may be HPLMN information (e.g., address of the home network) included in the subscriber permanent ID of the terminal, HPLMN information included in the international mobile subscriber identity (IMSI), or HPLMN information included in the 5G globally unique temporary identifier (5G-GUTI). Based on the terminal ID information, the AMF 405 may determine whether the terminal is a roaming terminal and obtain HPLMN information of the terminal.

The AMF 405 may send a request for terminal subscription information (UE subscription) to a UDM 409 of the HPLMN 401 of the terminal in step S404. The UDM 409 of the HPLMN 401 may confirm that the terminal is currently connected to PLMN V and transmit the terminal subscription information as a response to the request made by the VPLMN 403 (PLMN V) in step S405. In this case, the terminal subscription information returned by the UDM 409 may include slice information (NSSAI).

In this case, the slice information (NSSAI) returned by the UDM 409 may include information on all the slices provided by the HPLMN 401 to a subscriber terminal (subscribed S-NSSAIs), or include information available only at the time of roaming among the subscribed S-NSSAIs. For example, with reference to FIG. 3, the NSSAI returned by the UDM 409 to the AMF 405 at step S405 of FIG. 4 may include information on all the slices provided by the HPLMN 401 {PLMNA_S-NSSAI#1 340, PLMNA_S-NSSAI#2 350, PLMNA_S-NSSAI#3 360, PLMNA_S-NSSAI#4 370, and PLMNA_S-NSSAI#5 375}, or include information only on the slices available to the terminal in PLMN V based on the roaming agreement between the HPLMN 401 and the VPLMN 403 {PLMNA_S-NSSAI#1 380, PLMNA_S-NSSAI#2 385, PLMNA_S-NSSAI#3 390, PLMNA_S-NSSAI#4 395}.

The NSSAI returned by the UDM 409 to the AMF 405 at step S405 may include only hS-NSSAI values of the subscribed S-NSSAIs, or include vS-NSSAI values mapped with the hS-NSSAI values as well. For example, the NSSAI may include only hS-NSSAI values {(PLMNA_S-NSSAI#1), . . . }, or include hS-NSSAI values and vS-NSSAI values mapped therewith {(PLMNA_S-NSSAI#1, S-NSSAI#a), . . . }. This rule may be applied to all hS-NSSAI values included in the NSSAI returned by the UDM 409 to the AMF 405.

The NSSAI returned by the UDM 409 to the AMF 405 at step S405 may explicitly indicate the default S-NSSAI among the subscribed S-NSSAIs. For example, assume that the default S-NSSAI is PLMNA_S-NSSAI#1 and PLMNA_S-NSSAI#2 among the subscribed S-NSSAIs. Then, the NSSAI returned by the UDM 409 to the AMF 405 may include {(PLMNA_S-NSSAI#1, default), (PLMNA_S-NSSAI#2, default), (PLMNA_S-NSSAI#3), . . . }, or include {(PLMNA_S-NSSAI#1, default, S-NSSAI#a), (PLMNA_S-NSSAI#2, default, S-NSSAI#b), (PLMNA_S-NSSAI#3, S-NSSAI#c), . . . }.

The AMF 405 may transmit the NSSF a request for information on the slices available to the terminal (allowed NSSAI) (step S406 in FIG. 4). The request message at step S406 may include the requested NSSAI received from the terminal, the subscribed S-NSSAIs received from the UDM 409 of the HPLMN 401, and HPLMN information of the terminal. If the requested NSSAI is not received from the terminal, the request message may include information on the default S-NSSAIs received from the UDM 409 instead of the requested NSSAI. The default S-NSSAIs may be vS-NSSAI values {(S-NSSAI#a, S-NSSAI#b)} or hS-NSSAI values {(PLMNA_S-NSSAI#1, PLMNA_S-NSSAI#2)}. The NSSF can use the default S-NSSAIs instead of the requested NSSAI at steps S407, S408 and S409.

The NSSF may determine the slice information available to the terminal (allowed NSSAI) based on the information included in the request message received from the AMF 405 at step S406 and the information stored in the NSSF as shown in FIG. 2. For example, the AMF 405 may transmit the requested NSSAI (S-NSSAI#a, S-NSSAI#b), the subscribed S-NSSAIs (PLMNA_S-NSSAI#1, PLMNA_S-NSSAI#2, PLMNA_S-NSSAI#3, PLMNA_S-NSSAI#4), and the UE HPLMN information (PLMN A) to the NSSF. Based on the information received from the AMF 405 and the slice information stored in the NSSF for roaming support as shown in FIG. 2, the NSSF may determine a mapping between S-NSSAI#a and PLMNA_S-NSSAI#1 and a mapping between S-NSSAI#b and PLMNA_S-NSSAI#2 in step S409 in FIG. 4. The NSSF may determine the allowed NSSAI in consideration of mobile operator policies, network operation policies, and network deployment.

The NSSF (e.g., V-NSSF 411) may transmit the determined allowed NSSAI to the AMF 405 in step S410. The allowed NSSAI is the vS-NSSAI values that the terminal can use after connecting to the VPLMN 403. For example, the allowed NSSAI may include {(S-NSSAI#a), (S-NSSAI#b)}. The response message transmitted by the NSSAI to the AMF 405 in step S410 may also include information on the mapping between the vS-NSSAI and the hS-NSSAI. For example, the response message may include {(S-NSSAI#a, PLMNA_S-NSSAI#1), (S-NSSAI#b, PLMNA_S-NSSAI#2)}. The AMF 405 may perform AMF relocation in step S411. The AMF 405 may store the allowed NSSAI and NSSAI mapping information received from the NSSF. Thereafter, the AMF 405 may transmit a response message to the terminal in reply to the registration request in steps S412 and S413. The response message may include the allowed NSSAI and NSSAI mapping information. The response message for the registration request may be a registration accept message or a registration reject message.

To determine the allowed NSSAI, the NSSF can verify the validity of the requested NSSAI sent by the terminal in step S407. The network slice information stored in the terminal (configured NSSAI, allowed NSSAI, or available NSSAI being referred to as stored NSSAI) shown in FIG. 3 may include corresponding version information. The version information may be a date, a time, and a location where the stored NSSAI was last updated by the terminal, or may be version information or a time stamp specified by the information provider of the stored NSSAI (e.g., PLMN A, PLMN V). The version information may be composed of numbers, alphabets, special symbols, and the like. At step S401 in FIG. 4, the terminal may transmit the version information of the stored NSSAI together with the requested NSSAI. At step S406, the AMF 405 may transmit to the NSSF (e.g., V-NSSF 411) the requested NSSAI together with the version information of the stored NSSAI. At step 407, the NSSF may check the version information of the stored NSSAI of the terminal. If the version information is not up-to-date, the NSSF may transmit the allowed NSSAI including the latest NSSAI mapping information to the AMF 405 at step S410 and transmit an invalidity notification to an H-NSSF 415 at step S408.

Figure 5:
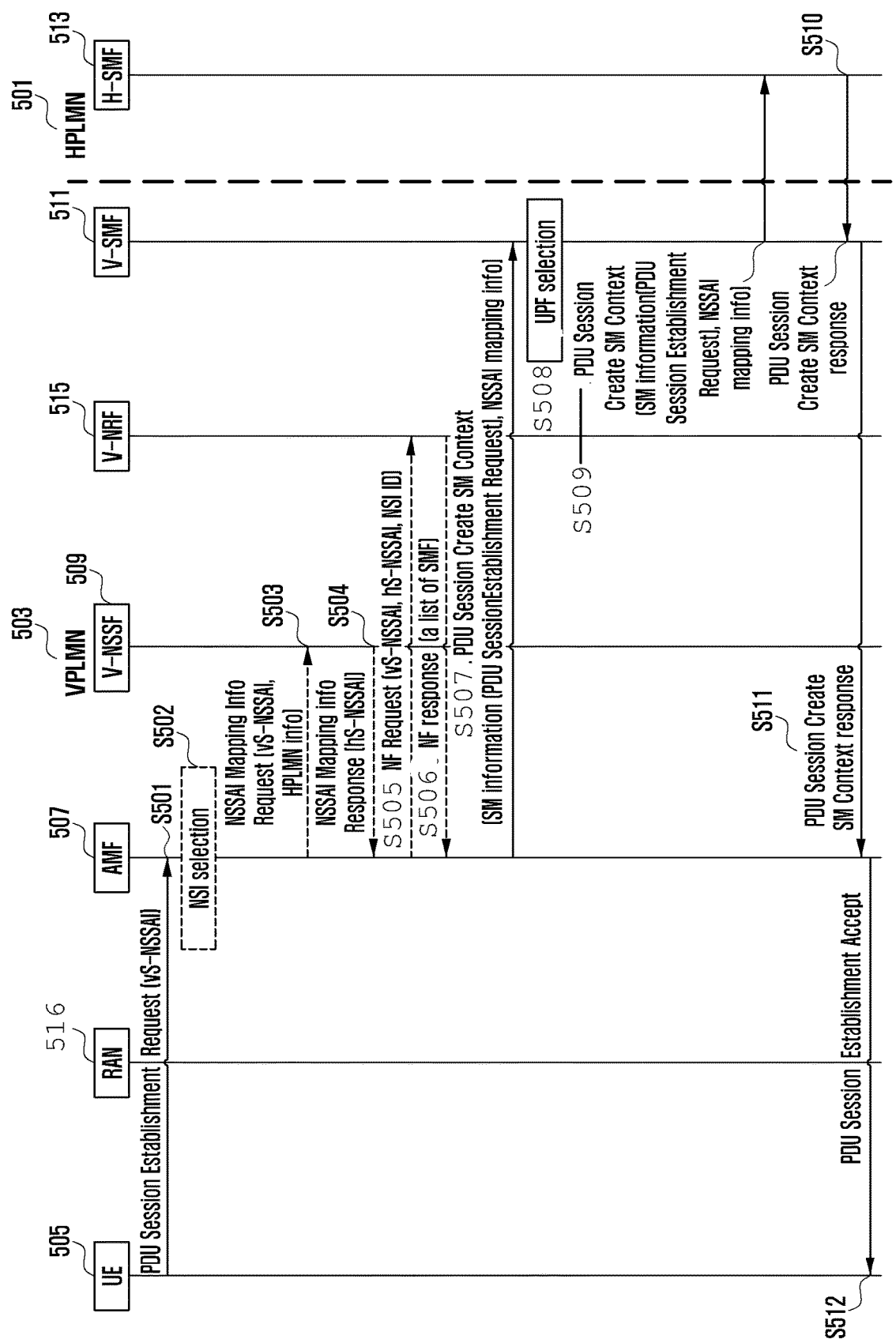
FIG. 5 is a flow diagram of a protocol data unit (PDU) session establishment procedure of a UE at a time of roaming according to an embodiment.

FIG. 5 is a flow diagram of a session establishment procedure of a terminal (e.g., UE) 505 at a time of roaming according to an embodiment. For example, a HPLMN 501 of the terminal 505 is PLMN A and a VPLMN 503 to which the terminal 505 is currently connected is PLMN V.

Referring to FIG. 5, at step S501, to use an application service, the terminal 505 may select the S-NSSAI capable of supporting the corresponding application. The S-NSSAI may be one included in the allowed NSSAI received at step S413 of FIG. 4. The S-NSSAI may be a vS-NSSAI value usable in the VPLMN 503 (PLMN V). The VPLMN 503 may include a RAN 516. The terminal 505 may transmit a PDU session establishment request including the selected S-NSSAI. AMF 507 may make an NSI selection at step S502.

Upon receiving the PDU session establishment request at step S501 of FIG. 5, an AMF 507 may perform the following operations for session establishment.

When the hS-NSSAI value mapped with the vS-NSSAI value sent by the terminal 505 is stored in the AMF 507, steps S503 and S504 may be skipped. The network slice information stored in the VPLMN as shown in FIG. 2 may be stored in advance as the NSSAI mapping information in the AMF 507. Alternatively, an NSSF (e.g., V-NSSF 509) may provide the AMF 507 with the NSSAI mapping information at step S410 in the terminal registration procedure of FIG. 4.

If the NSSAI mapping information is not stored in the AMF 507, the AMF 507 may transmit a request for the NSSAI mapping information to the V-NSSF 509 at step S503. The request message may include a vS-NSSAI value requested by the terminal and the HPLMN information of the terminal 505. Based on the stored slice information as shown in FIG. 2, the V-NSSF may return the hS-NSSAI value of the HPLMN mapped with the vS-NSSAI value to the AMF 507 at step S504. For example, at step S503, the AMF 507 may transmit S-NSSAI#b as the vS-NSSAI value to the V-NSSF 509 and transmit PLMN A as the HPLMN information. The V-NSSF 509 may refer to the information as shown in FIG. 2 and return PLMNA_S-NSSAI #2 250 being the hS-NSSAI value of PLMN A mapped with S-NSSAI#b to the AMF 507.

In addition, if information on a V-SMF node 511 supporting vS-NSSAI is stored in the AMF 507, steps S505 and S506 may be skipped.

For session establishment, the AMF 507 may transmit a PDU session create session management (SM) context request to the V-SMF 511 supporting the vS-NSSAI included by the terminal 505 at step 507. The PDU session create SM context request message may include the PDU session establishment request sent by the terminal 505 at step 501. The PDU session create SM context request message may contain the NSSAI mapping information including hS-NSSAI information mapped with the vS-NSSAI included by the terminal 505 at step S501. For example, the NSSAI mapping information sent by the AMF 507 to the V-SMF 511 may be in the form of {(S-NSSAI#b, PLMNA_S-NSSAI#2)}.

Based on the PDU session establishment request and the NSSAI mapping information received from the AMF 507, the V-SMF 511 may select an H-SMF 513 that provides the corresponding slice at step S508. For H-SMF selection, the V-SMF 511 may use the S-NSSAI value included in the PDU session establishment request or NSSAI mapping information. As a means for using the S-NSSAI value, the V-SMF 511 may send an NF discovery request message containing the S-NSSAI value to the V-NRF (network repository function) or H-NRF. Upon receiving the network function (NF) discovery request message, a V-NRF 515 or the H-NRF can select the H-SMF 513 supporting the S-NSSAI and provide the H-SMF information to the V-SMF 511. The S-NSSAI value may be a vS-NSSAI value or an hS-NSSAI value. For example, the vS-NSSAI value may be S-NSSAI#b, and the hS-NSSAI value may be PLMNA_S-NSSAI#2.

For session establishment, the V-SMF 511 may forward the PDU session create SM context request to the H-SMF 513 at step S509. The PDU session create SM context request message may include the PDU session establishment request and the NSSAI mapping information. The PDU session establishment request may include the vS-NSSAI value as it is provided by the terminal 505. Alternatively, the V-SMF 511 may convert the vS-NSSAI value included in the PDU session establishment request into an hS-NSSAI value and transmit the hS-NSSAI value to the H-SMF 513 before sending the message to the H-SMF 513.

The step of using the NSSAI mapping information during session establishment may be skipped if the session requested by the terminal 505 is a local breakout session.

Upon completing the session establishment of the HPLMN NF, the H-SMF 513 may transmit a PDU session create SM context response message to the V-SMF at step S510. The V-SMF 511 may send the AMF 507 a PDU session create SM context response indicating session setup completion at step S511. The AMF 507 may send the terminal a PDU session establishment accept message indicating session setup completion at step S512.

Figure 6:
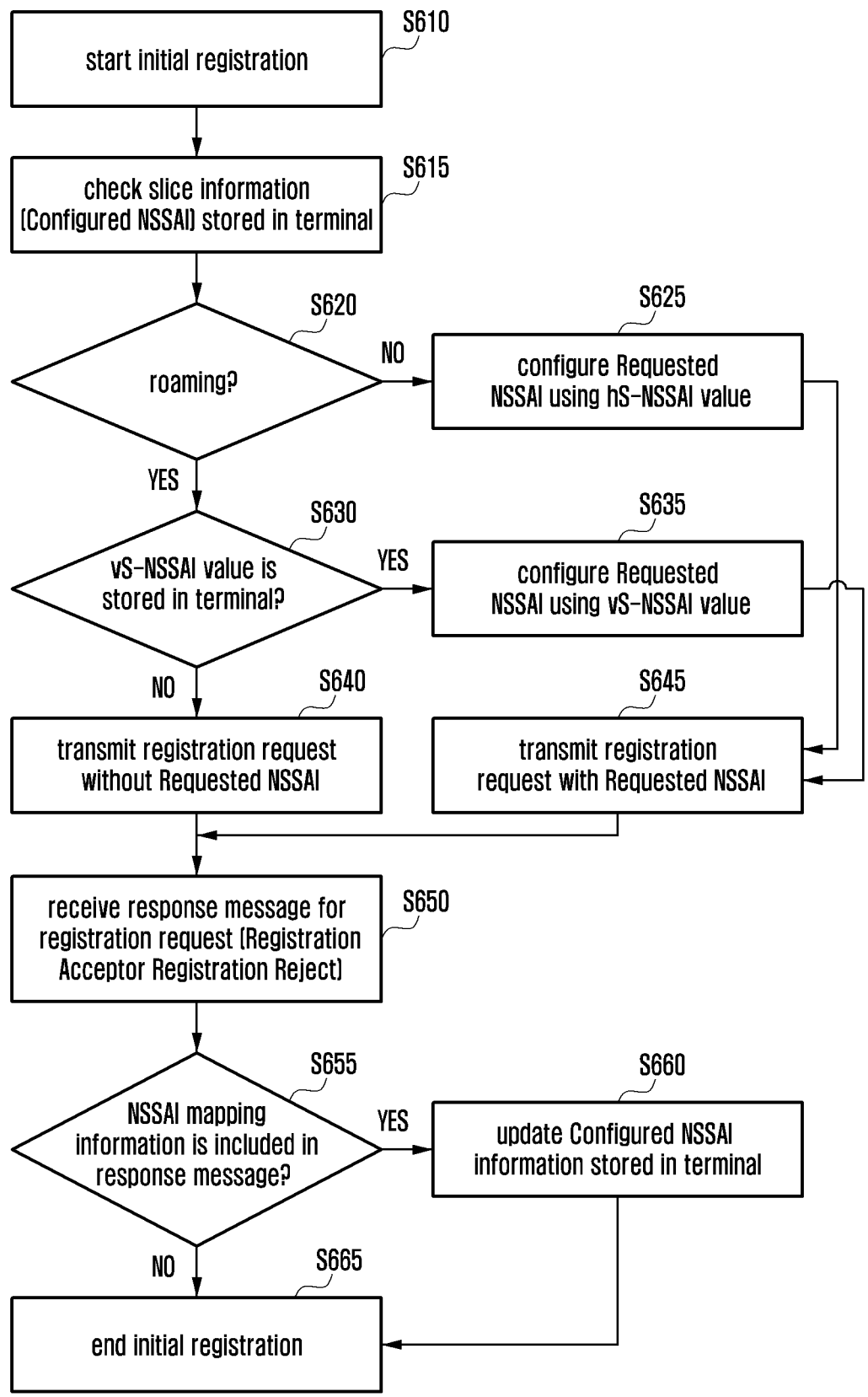
FIG. 6 is a flowchart of UE operations for roaming support according to an embodiment.

FIG. 6 is a flowchart of UE operations for roaming support according to an embodiment.

A terminal starts the initial registration procedure at step S610. The terminal may request slice information to be used later (requested NSSAI) during the initial registration procedure. The requested NSSAI may be a list of one or more S-NSSAI values. To configure the requested NSSAI, the terminal may refer to the network slice information (configured NSSAI) stored in the terminal as shown in FIG. 3 at step S615. As the terminal is roaming at step S620, the terminal may check whether the vS-NSSAI value of PLMN V being the current VPLMN is included in the network slice information (configured NSSAI) stored in the terminal as shown in FIG. 3 at step S630.

As the terminal is not roaming at step S620, the terminal may configure requested NSSAI using hs-NSSAI value at step S625.

The vS-NSSAI value is not stored in terminal at step S630, the terminal may transmit registration request without Requested NSSAI at step S640.

If the vS-NSSAI value of PLMN V is stored in the terminal, the terminal may configure the requested NSSAI based on the vS-NSSAI value of PLMN V at step S635, and transmit a registration request message containing the requested NSSAI to the VPLMN at step S645. For example, in FIG. 3, the terminal may use four slices of PLMN V, i.e., S-NSSAI#a 380, S-NSSAI#b 385, S-NSSAI#c 390, and S-NSSAI#d 395. The terminal may select a slice to be used among the four slices available in the PLMN VPLMN to configure the requested NSSAI. In this case, the requested NSSAI may be composed of S-NSSAI#a and S-NSSAI#b.

If the vS-NSSAI value of PLMN V is not stored in the terminal, the terminal may determine not to configure the requested NSSAI and transmit a registration request message without the requested NSSAI to the VPLMN at step S650.

Upon receiving the response message for the registration request from the AMF at step S650, the terminal may check whether NSSAI mapping information is included in the response message at step S655. If NSSAI mapping information is included, the terminal can update the stored network slice information as shown in FIG. 3 according to the NSSAI mapping information at step S660. For example, if the NSSAI mapping information received from the AMF includes {(S-NSSAI#e, PLMNA_S-NSSAI#1), (S-NSSAI#a, PLMNA_S-NSSAI#2)}, the terminal may change, among the stored network slice information as shown in FIG. 3, the vS-NSSAI value 380 of PLMN V mapped with PLMNA_S-NSSAI#1 (hS-NSSAI) from S-NSSAI#a to S-NSSAI#e, and change the vS-NSSAI value 385 of PLMN V mapped with PLMNA_S-NSSAI#2 (hS-NSSAI) from S-NSSAI#b to S-NSSAI#a.

Thereby, when roaming, the terminal may complete the initial registration procedure with the VPLMN at step S665.

Second Embodiment

In a mobile communication environment, a terminal accesses a network to receive a mobile communication service. There are functions provided by the terminal and the network, and the terminal and the network may operate corresponding functions through communication based on agreed protocols. To this end, the terminal and the network must exchange information to know the functions supported by the other. In addition, even if the functions supported by the terminal and the network are different from each other, a method is needed that does not generate an error.

Figure 7:
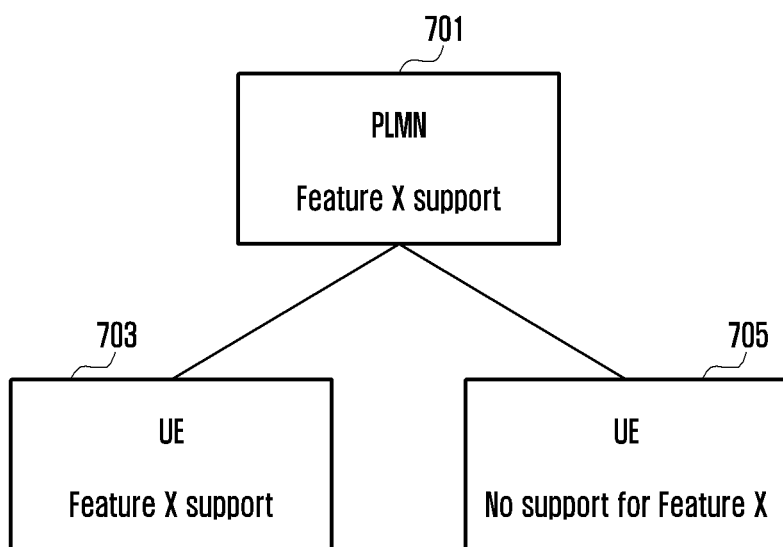
FIG. 7 is a block diagram of a system when a PLMN supports feature X in a non-roaming scenario according to an embodiment.

FIG. 7 is a block diagram of a scenario where a PLMN 701 supports feature X in a non-roaming case according to an embodiment. In this scenario, a terminal connecting to the PLMN 701 may be a terminal 703 that supports feature X or may be a terminal 705 that does not support feature X.

Figure 8:
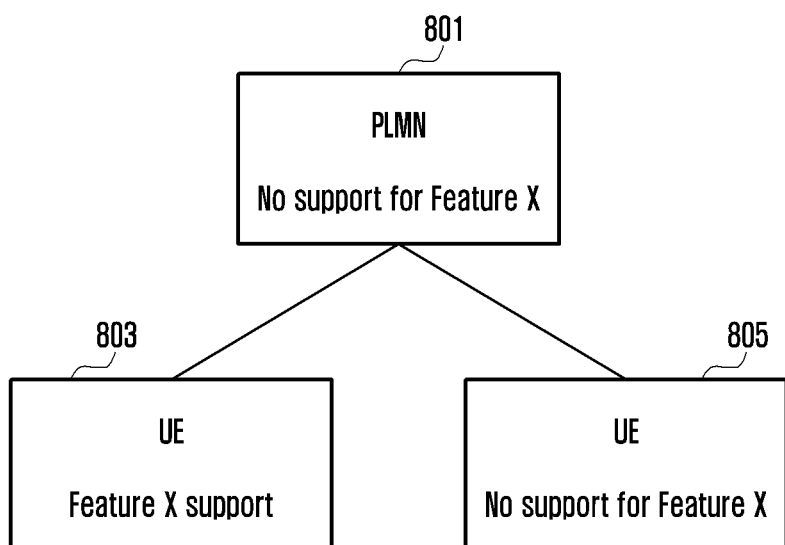
FIG. 8 is a block diagram of a system when a PLMN does not support feature X in a non-roaming scenario according to an embodiment.

FIG. 8 is a block diagram of a scenario where a PLMN 801 does not support feature X in a non-roaming case according to an embodiment. In this scenario, a terminal connecting to the PLMN 801 may be a terminal 803 that supports feature X or may be a terminal 805 that does not support feature X.

Figure 9:
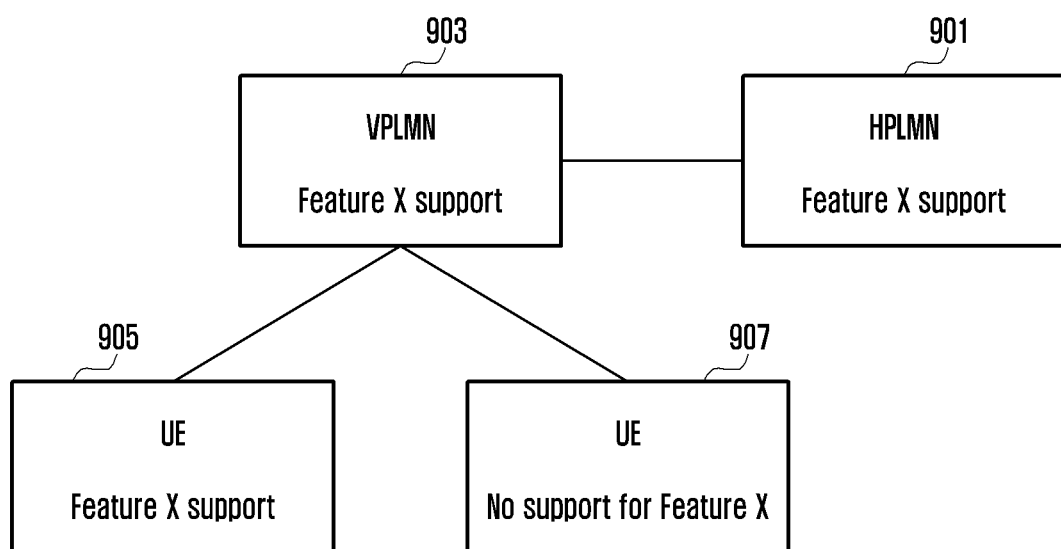
FIG. 9 is a block diagram of a system when an HPLMN and a VPLMN support feature X in a roaming scenario according to an embodiment.

FIG. 9 is a block diagram of a scenario where an HPLMN 901 and the VPLMN 903 support feature X in a roaming case according to an embodiment. In this scenario, a terminal connecting to the VPLMN 903 may be a terminal 905 that supports feature X or may be a terminal 907 that does not support feature X.

Figure 10:
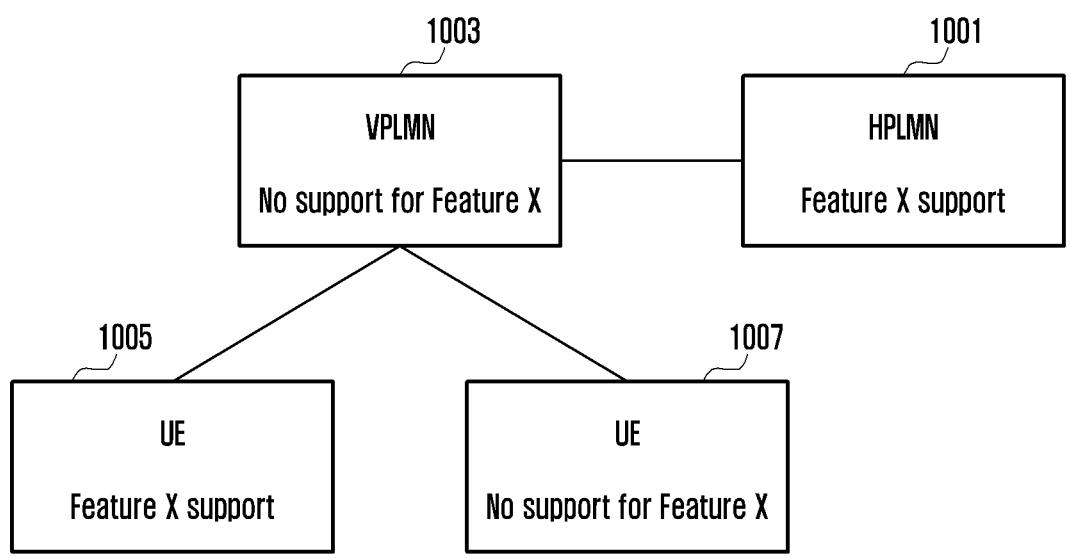
FIG. 10 a block diagram of a system when an HPLMN supports feature X and a VPLMN does not support feature X in a roaming scenario according to an embodiment.

FIG. 10 is a block diagram of a scenario where an HPLMN 1001 supports feature X and a VPLMN 1003 does not support feature X in a roaming case according to an embodiment. In this scenario, a terminal connecting to the VPLMN 1003 may be a terminal 1005 that supports feature X or may be a terminal 1007 that does not support feature X.

Figure 11:
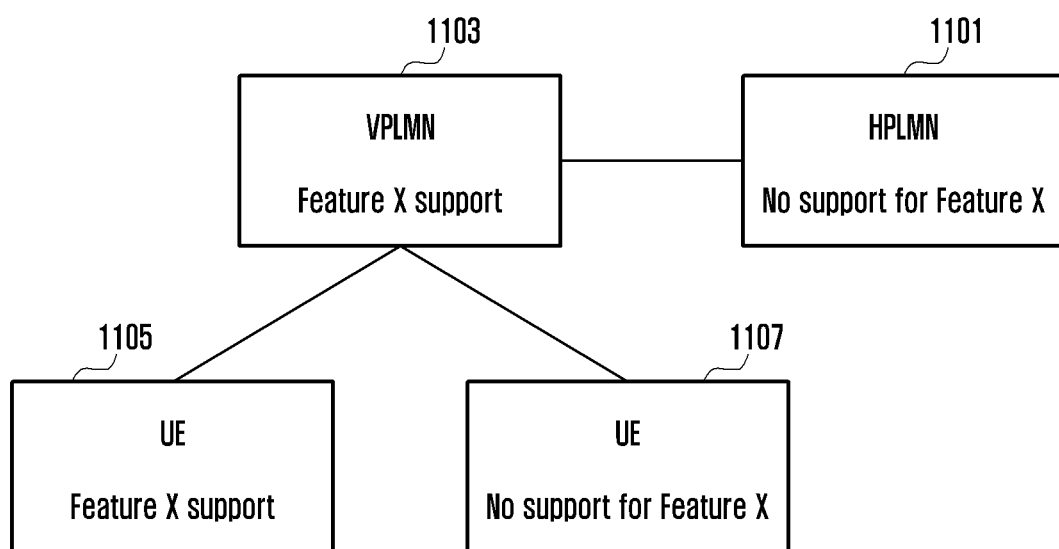
FIG. 11 is a block diagram of a system configuration when an HPLMN does not support feature X and a VPLMN supports feature X in a roaming scenario according to an embodiment.

FIG. 11 is a block diagram of a scenario where an HPLMN 1101 does not support feature X and a VPLMN 1103 supports feature X in a roaming case according to an embodiment. In this scenario, a terminal connecting to the VPLMN 1103 may be a terminal 1105 that supports feature X or may be a terminal 1107 that does not support feature X.

In FIGS. 7, 8, 9, 10, and 11, feature X may be a certain function provided by the terminal or the network. For example, feature X may be a voice service function, a data service function, an internet protocol (IP) multimedia subsystem (IMS) service function, a short message service (SMS) function, an SMS over non-access stratum (SMS-over-NAS) function, a mobile edge computing (MEA) function, a mobile initiated connection only (MICO) function, or a network slicing function.

The network slicing functions supported by the terminal are as follows.

The terminal may store network-slice related information (configured NSSAI and a network slice selection policy (NSSP)). This information stored in the terminal may be referred to as UE configuration information. The slice related information may include the S-NSSAI defining one slice, the NSSAI being a set of S-NSSAI, S-NSSAI information associated with an application installed in the terminal, and priority information between S-NSSAIs.

During initial registration to the PLMN, the terminal can transmit the slice information to be used after registration (S-NSSAI or requested NSSAI) to the 5G node.

During initial registration to the PLMN, the terminal can process the slice information that is received from the 5G node and is available to the terminal after network registration (S-NSSAI, allowed NSSAI, or available NSSAI). In this case, processing the slice information may include storing the slice information in the terminal, updating pre-stored slice related information (configured NSSAI or NSSP), and processing a slice that is requested (requested NSSAI) but not authorized for use.

After registration to the PLMN, for requesting a session to use a certain application, the terminal may select a slice suitable for the application (S-NSSAI) and transmit a session request message containing the S-NSSAI to the 5G node.

After registration to the PLMN, when the terminal enters a new registration area (RA) owing to a handover, the terminal can handle the case where a slice available in the previous area is no longer available in the new area and the case where a slice not available in the previous area becomes available in the new area. In this case, the slice handling operation may include determining the priority of a slice available in the new RA based on the slice information (NSSP) stored in the terminal to maintain the PDU session in use.

The slice handling operation may also include updating the slice related information stored in the terminal (configured NSSAI or NSSP) via communication with the network.

In the scenarios illustrated in FIGS. 7 to 11, the terminal supporting the network slicing function indicates a terminal that supports the network slicing function described above. In the scenarios illustrated in FIGS. 7 to 11, the terminal that does not support the network slicing function indicates a terminal that does not support the network slicing function described above.

The network slicing functions supported by the network are as follows.

The network may manage the slice information usable for each terminal (subscribed S-NSSAIs) as terminal subscriber information (UE subscription). The UE subscription information including the slice information usable for the terminal can be stored in a 5G node serving as a database for storing subscription information. For example, the 5G node may be the UDM.

The network can configure in advance the slice information supported by the network in a 5G node. In this case, the 5G node may be the 5G RAN, AMF, session management function (SMF), user plane function (UPF), and the like.

The network can process the slice information (S-NSSAI or requested NSSAI) that has been transmitted by the terminal to the 5G node (e.g., AMF) during initial registration to the PLMN and can be used by the terminal after network registration. Requested NSSAI processing of the 5G node may include determining the slice information (S-NSSAI, allowed NSSAI, or available NSSAI) that can be used by the terminal after network registration on the basis of the requested NSSAI, the subscribed S-NSSAIs stored in the UDM, and the deployment status of the 5G node supporting the slice (granting or rejecting a usage request for the slice (requested NSSAI) made by the terminal); determining an RA capable of supporting the allowed NSSAI or the available NSSAI; and transmitting the allowed NSSAI or the available NSSAI to the terminal.

The operation of the network may include checking the validity of the S-NSSAI included in the PDU session establishment request made by the terminal.

The operation of the network may include determining the allowed NSSAI or available NSSAI usable in the new RA when a handover occurs after terminal registration to the PLMN; determining an RA capable of supporting the allowed NSSAI or available NSSAI; delivering the allowed NSSAI or available NSSAI to the terminal; and renewing or terminating the existing PDU session of the terminal based on the slice available in the new RA.

The operation of the network may include updating, when there is a change in the subscriber information or in the deployment status of the 5G node supporting the slice, the slice related information (configured NSSAI or NSSP) stored in the terminal correspondingly.

The operation of the network may include making a roaming agreement with another PLMN for slice support at the time of roaming, and storing the roaming agreement information in the 5G node.

In the scenarios illustrated in FIGS. 7 to 11, the network supporting the network slicing function indicates a network that supports the network slicing function described above. In the scenarios illustrated in FIGS. 7 to 11, the network that does not support the network slicing function indicates a network that does not support the network slicing function described above.

The terminal may include a list of PLMNs supporting the slices in the UE configuration information. The HPLMN may configure the terminal with the PLMN list supporting the slices. Based on the UE configuration information, the terminal may determine whether the PLMN to be initially registered supports a desired slice. If connecting to a PLMN supporting a desired slice, the terminal may enable the slicing function thereof. If connecting to a PLMN not supporting a desired slice, the terminal may disable the slicing function thereof.

Figure 12A:
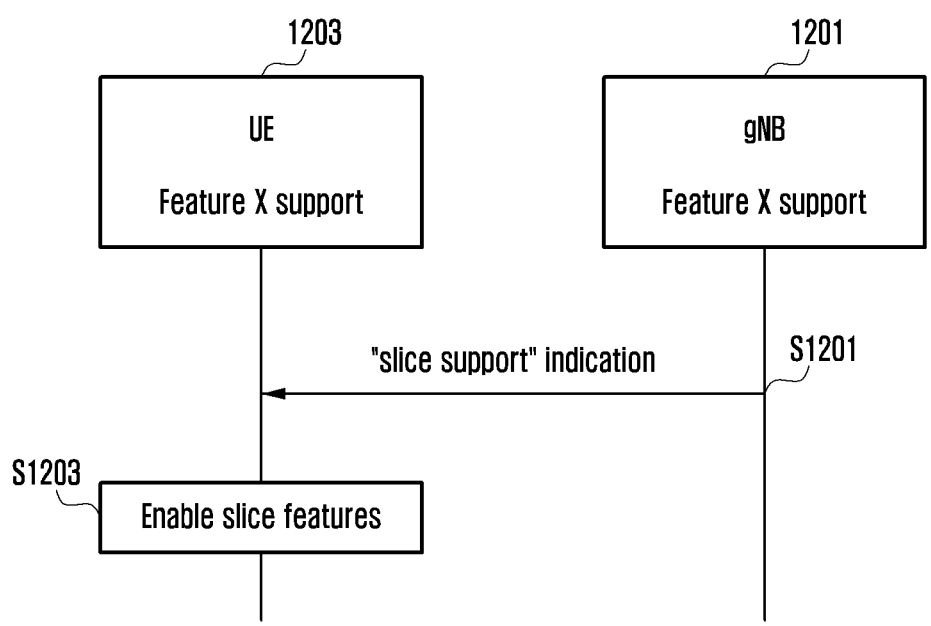
FIGS. 12A and 12B are flow diagrams of procedures for transmitting a system information block (SIB) message including a feature X support indication according to an embodiment.
Figure 12B:
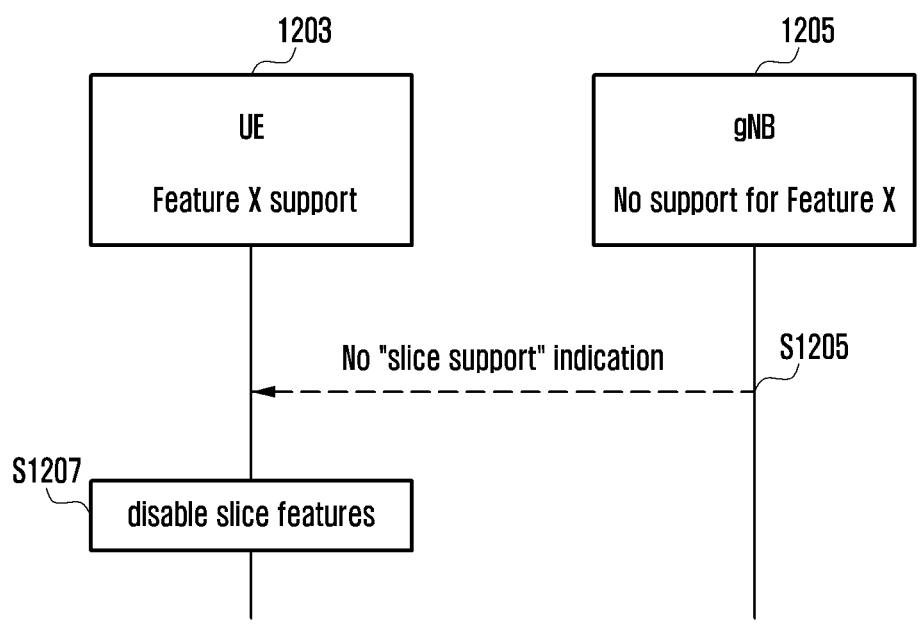

FIGS. 12A and 12B are flow diagrams of procedures for a network to transmit a SIB message including a feature X support indication according to an embodiment. For example, feature X is the network slicing function.

Referring to FIG. 12A, a 5G RAN or gNB 1201 of a PLMN supporting the slice can broadcast a SIB message containing a slicing support indication at step S1201. Upon receiving the SIB message, a terminal 1203 may be aware that the corresponding PLMN that supports the slicing function and enable the slicing function at step S1203.

Referring to FIG. 12B, a 5G RAN or gNB 1205 of a PLMN not supporting the slice can broadcast a SIB message without a slicing support indication. Upon receiving the SIB message, the terminal 1203 may be aware that the corresponding PLMN does not support the slicing function and disable the slicing function at step S1207.

Alternatively, the 5G RAN or gNB 1205 of a PLMN that does not support the slice can broadcast a SIB message containing a no-slicing support indication at step S1205. Upon receiving the SIB message, the terminal 1203 may be aware that the corresponding PLMN does not support the slicing function and disable the slicing function at step S1207.

Figure 13:
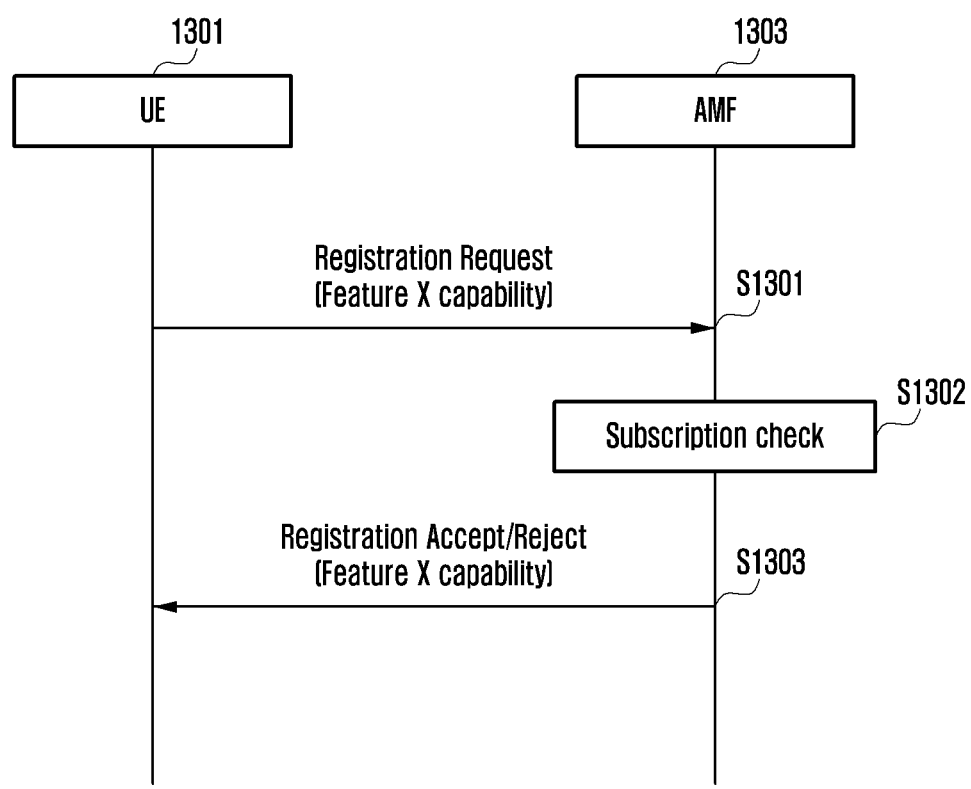
FIG. 13 is a flow diagram of a process for exchanging information indicating whether feature X is supported in a registration procedure according to an embodiment.

FIG. 13 is a flow diagram of a process for exchanging information indicating whether feature X is supported in a registration procedure according to an embodiment. For example, feature X is the network slicing function.

Referring to FIG. 13, during initial registration, a terminal 1301 may transmit to an AMF 1303 a registration request message containing UE capability information indicating whether the terminal 1301 can support a slicing function at step S1301.

Alternatively, the UE capability information indicating whether the terminal can support the slicing function may be included in the UE subscription information stored in the UDM of the network. In this case, even if the registration request message does not include the slicing support capability information, the AMF 1303 may refer to the UE subscription information at step S1302 (subscription check) to identify whether the terminal 1301 supports the slicing function.

As a reply to the registration request during initial registration, the AMF 1303 may transmit to the terminal 1301 a response message containing network capability information indicating whether the network can support the slicing function at step S1303. Upon receiving the network capability information, the terminal 1301 may enable or disable the slice function thereof depending on whether the network supports the slicing function. For example, if the network supports the slice, the terminal 1301 may enable the slicing function thereof. If the network does not support the slice, the terminal 1301 may disable the slicing function thereof.

The response message sent by the AMF 1303 to the terminal 1301, as a reply to the registration request during registration, may be a registration accept message or a registration reject message at step S1303.

Figure 14:
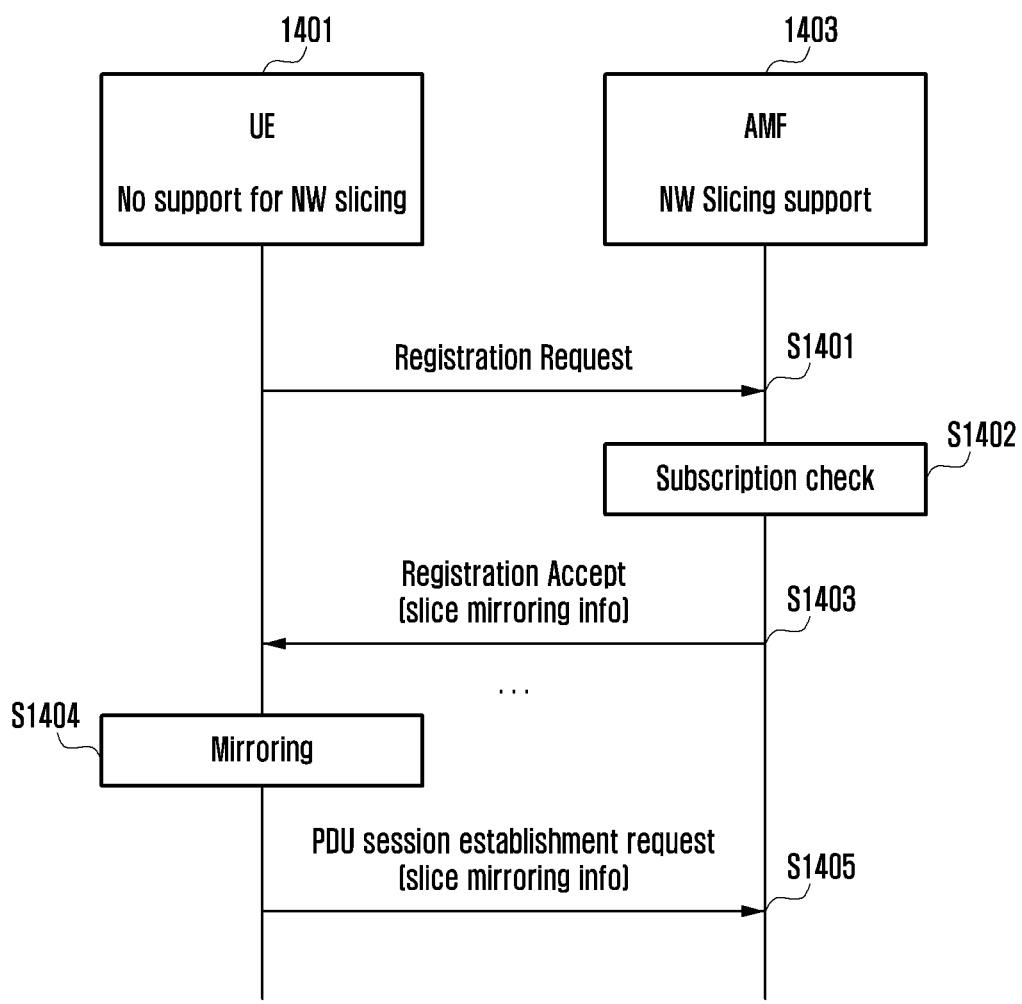
FIG. 14 is a flow diagram of a procedure for communication between a UE that does not support network slicing and a PLMN that supports network slicing according to an embodiment.

FIG. 14 is a flow diagram of a procedure for communication between a terminal 1401 not supporting network slicing and a PLMN supporting network slicing according to an embodiment. For example, feature X is the network slicing function.

Referring to FIG. 14, for initial registration, the terminal 1401 not supporting the slicing function may transmit a registration request message to the 5G node at step S1401. In this case, since the terminal 1401 does not support the slicing function, the registration request message does not include slice-related information. The slice-related information may be the requested NSSAI.

Upon receiving the registration request message, an AMF 1403 may be aware that the terminal 1401 does not support the slicing function. Whether the terminal 1401 supports the slicing function may be determined by use of a method proposed in the present disclosure (checking UE subscription information, or including slicing support capability information in the registration request). Since the terminal 1401 does not support the slicing function, the AMF 1403 may transmit to the terminal 1401 a registration accept message not including slice-related information. In this case, the slice-related information may indicate the allowed NSSAI or available NSSAI, which is slice information useable by the terminal 1401 connecting to the network. The AMF 1403 may include slice mirroring information in the registration accept message to be sent to the terminal 1401. The slice mirroring information may include single-slice information (S-NSSAI). It is possible to determine the S-NSSAI to be used as slice mirroring information according to the terminal subscription information. For example, when an IoT terminal indication is present in the terminal subscription information, an S-NSSAI value (e.g., S-NSSAI#IoT) indicating a slice supporting IoT may be selected as slice mirroring information. For example, when a vehicle terminal indication is present in the terminal subscription information, an S-NSSAI value (e.g., S-NSSAI#V2X) indicating a slice supporting V2X may be selected as slice mirroring information.

Upon receiving the registration accept message at step S1403, the terminal 1401 can process the slice mirroring information included in the registration accept message at step S1404. In this case, the terminal 1401 may be unable to interpret the S-NSSAI value included as the slice mirroring information. If the slice information is needed after registration, the terminal may include the S-NSSAI value serving as the slice mirroring information in the NAS signaling operation. For example, the terminal 1401 can transmit a PDU session establishment request message including the S-NSSAI value as the slice mirroring information at step S1405. That is, although the terminal 1401 cannot interpret the S-NSSAI value contained in the slice mirroring information, the terminal 1401 may use the S-NSSAI value included in the slice mirroring information for a message requiring an S-NSSAI value. For example, when receiving S-NSSAI#V2X as the slice mirroring information, the terminal 1401 may transmit a registration request message or PDU session establishment request message containing S-NSSAI#V2X in the future. As such, even if a terminal 1401 does not support the slicing function, the network may treat the terminal 1401 as a terminal supporting the slicing function. Although the terminal 1401 performing the above operation does not support the slicing function, the terminal 1401 may use the S-NSSAI value received as slice mirroring information for a message requiring slice information during signaling with the AMF 1403.

Figure 15:
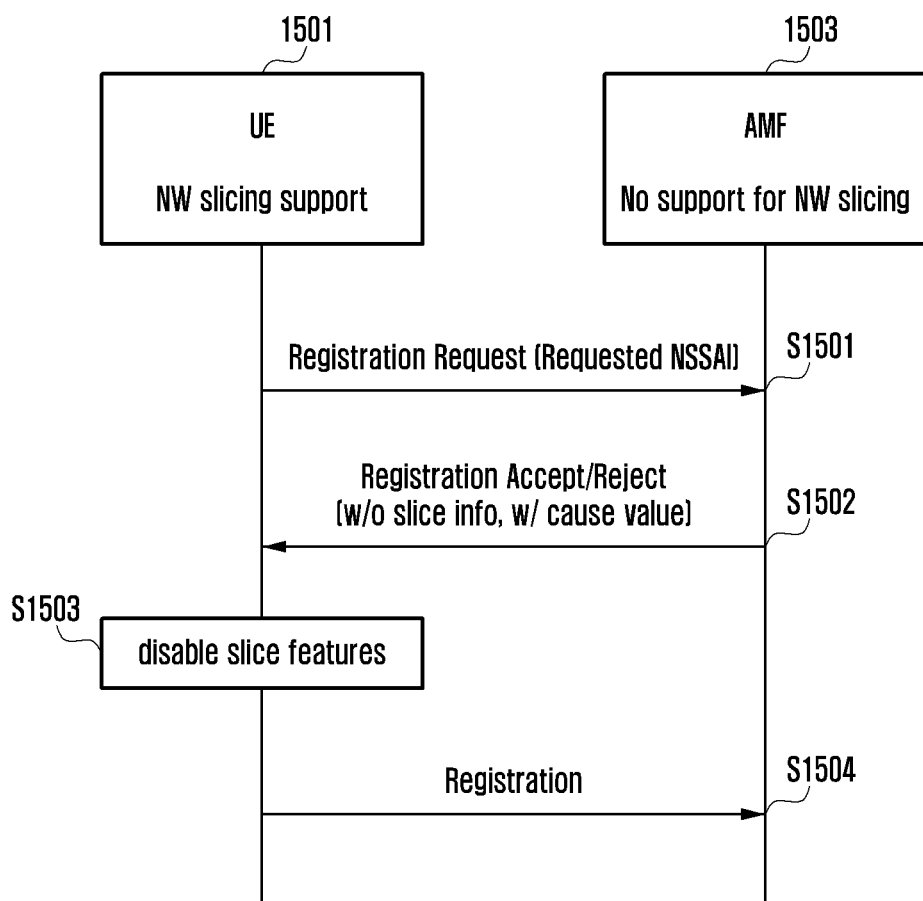
FIG. 15 is a flow diagram of a procedure for communication between a UE that supports network slicing and a PLMN that does not support network slicing according to an embodiment.

FIG. 15 is a flow diagram of a procedure for communication between a terminal 1501 supporting network slicing and a PLMN not supporting network slicing according to an embodiment.

Referring to FIG. 15, an explicit indication of whether the slice function is supported is not used, and whether the slice function is supported is implicitly determined. For example, feature X is the network slicing function.

For initial registration, the terminal 1501 supporting the slicing function may transmit a 5G node a registration request message including slice information to be used after network registration (requested NSSAI) at step S1501.

As an AMF 1503 receiving the registration request message does not support the slicing function, the AMF 1503 does not support the function of determining the allowed NSSAI. Hence, the AMF 1503 may transmit a response message not including the slice information (allowed NSSAI or available NSSAI) as a reply to the registration request at step S1502. Alternatively, the AMF 1503 may transmit a response message including a cause value indicating that the requested NSSAI requested by the terminal 1501 is not supported as a reply to the registration request. The response message sent by the AMF 1503 to the terminal 1501 as a reply to the registration request during registration may be a registration accept message or a registration reject message.

Upon receiving the response message for the registration request, the terminal 1501 may be aware that the corresponding network does not support the slicing function by checking that the response message does not include the slice information (allowed NSSAI or available NSSAI). Alternatively, upon receiving the response message for the registration request, the terminal 1501 may be aware that the corresponding network does not support the slicing function by checking the cause value included in the response message. Since the corresponding network does not support the slicing function, the terminal 1501 may disable the slicing function thereof at step S1503.

If the response message for the registration request is a registration reject message, the terminal 1501 may transmit a registration request message again at step S1504. This registration request message does not include the requested NSSAI.

Figure 16:
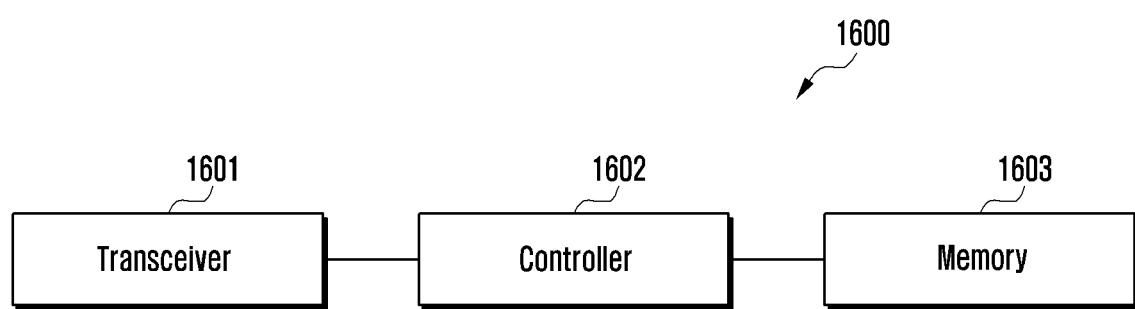
FIG. 16 is a block diagram of a UE according to an embodiment.

FIG. 16 is a block diagram of a terminal 1600 according to an embodiment.

Referring to FIG. 16, the terminal 1600 may include a transceiver 1601, a controller 1602, and storage 1603. In the present disclosure, the controller 1602 may include a circuit, an application-specific integrated circuit (ASIC), or at least one processor.

The transceiver 1601 may transmit and receive signals to and from another network entity.

The controller 1602 may control the overall operation of the terminal 1600 according to the embodiments. For example, the controller 1602 may control the signal flow to perform the operations in FIGS. 1 and 2 described above. For example, in one embodiment, the control unit 1602 may compare capability information of the terminal 1600 with that of a 5G network to provide a mobile communication service without generating an error. In one embodiment, the controller 1602 may provide a roaming service by enabling interworking between the slicing functions that is defined differently for different mobile network operators.

The storage 1603 may store at least one of information exchanged through the transceiver 31 and information generated by the controller 32.

Figure 17:
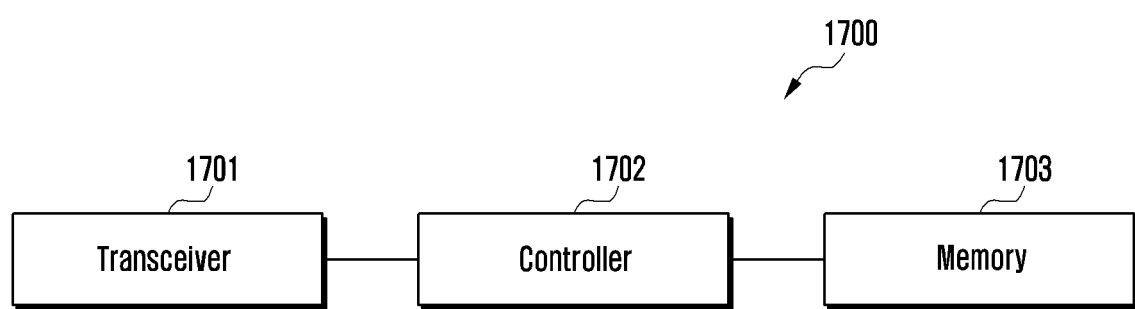
FIG. 17 is a block diagram of a network entity according to an embodiment.

FIG. 17 is a block diagram of a network entity 1700 according to an embodiment. The network entity 1700 may correspond to each of the network entities shown in FIGS. 1 and 15. For example, the network entity 1700 may refer to each of the network functions in the VPLMN shown in FIG. 1, or may refer to each of the network functions in the HPLMN shown in FIG. 1.

Referring to FIG. 17, the network entity 1700 may include a transceiver 1701, a controller 1702, and storage 1703. In the present disclosure, the controller 1702 may include a circuit, an ASIC, or at least one processor.

The transceiver 1701 may transmit and receive signals to and from a terminal or another network entity.

The controller 1702 may control the overall operation of the network entity 1700 according to an embodiment. For example, the controller 1702 may control the signal flow to perform the operations in FIGS. 1 and 2 described above. For example, the control unit 1702 may compare capability information of a terminal with that of a 5G network to provide a mobile communication service without generating an error. The controller 1702 may provide a roaming service by enabling interworking between the slicing functions defined differently for different mobile network operators.

The storage 1703 may store at least one of information exchanged through the transceiver 1701 and information generated by the controller 1702.

While the present disclosure has been particularly shown and described with reference to certain embodiments thereof, it is clearly understood that the same is by way of illustration and example only and is not intended to be taken in conjunction with the present disclosure. It will be understood by those skilled in the art that various changes in form and details may be made therein without departing from the subject matter and scope of the present disclosure as defined by the appended claims and their equivalents.

What is claimed is:

1. A method performed by a network slice selection function (NSSF) entity of a visited public land mobile network (VPLMN) in a wireless communication system, the method comprising:
   receiving, from an access and mobility management function (AMF) entity, a first message for requesting a network slice selection for a terminal, wherein the first message includes subscribed network slice selection assistance information (NSSAI) for a home public land mobile network (HPLMN) of the terminal;
   determining allowed NSSAI for terminal without interacting with the HPLMN, the allowed NSSAI being determined based on the first mapping information; and
   transmitting, to the AMF entity, a second message including the allowed NSSAI for the terminal.

2. The method of claim 1, wherein the second message further includes second mapping information for the allowed NSSAI of the VPLMN and the subscribed NSSAI of the HPLMN based on the first mapping information.

3. The method of claim 2, wherein a third message is transmitted from the AMF entity to the terminal, the third message including the allowed NSSAI for the terminal and the second mapping information.

4. The method of claim 1, wherein the subscribed NSSAI for the HPLMN of the terminal is transmitted from a unified data management (UDM) entity of the HPLMN to the AMF entity of the VPLMN.

5. A method performed by a terminal in a wireless communication system, the method comprising:
   transmitting, to an access and mobility management function (AMF) entity of a visited public land mobile network (VPLMN) connected to the UE terminal when roaming, a first message; and
   receiving, from the AMF entity, a second message as a response to the first message, the second message including allowed network slice selection assistance information (NSSAI) for the terminal,
   wherein the allowed NSSAI is transmitted from a network slice selection function (NSSF) entity of the VPLMN to the AMF entity,
   wherein the allowed NSSAI is determined, by the NSSF entity of the VPLMN without interacting with a home public land mobile network (HPLMN), based on mapping a subscribed NSSAI for the HPLMN of the terminal and NSSAI to be used in the VPLMN of the terminal in case that the HPLMN and the VPLMN have an agreement, and
   wherein the subscribed NSSAI for the HPLMN of the terminal is transmitted from the AMF entity to the NSSF entity of the VPLMN.

6. The method of claim 5, wherein the subscribed NSSAI for the HPLMN of the terminal is transmitted from a unified data management (UDM) entity of the HPLMN to the AMF entity of the VPLMN.

7. The method of claim 5, wherein the second message further includes mapping information for the allowed NSSAI.

8. An network slice selection function (NSSF) entity of visited public land mobile network (VPLMN) in a wireless communication system, the NSSF entity comprising:
   a transceiver; and
   a controller configured to:
      receive, from an access and mobility management function (AMF) entity, via the transceiver, a first message for requesting a network slice selection for a terminal, the first message including subscribed network slice selection assistance information (NSSAI) for a home public land mobile network (HPLMN) of the terminal,
      generate first mapping information by mapping the subscribed NSSAI for the HPLMN of the terminal and NSSAI to be used in the VPLMN of the terminal based on an agreement, in case that the HPLMN and the VPLMN have the agreement,
      determine allowed NSSAI for the terminal without interacting with the HPLMN, the allowed NSSAI being determined based on the first mapping information, and
      transmit, to the AMF entity, via the transceiver, a second message including the allowed NSSAI for the terminal.

9. The NSSF entity of claim 8, wherein the second message further includes second mapping information for the allowed NSSAI of the VPLMN and the subscribed NSSAI of the HPLMN based on the first mapping information.

10. The NSSF entity of claim 9, wherein a third message is transmitted from the AMF entity to the terminal, the third message including the allowed NSSAI for the terminal and the second mapping information.

11. The NSSF entity of claim 8, wherein the subscribed NSSAI for the HPLMN of the terminal is transmitted from a unified data management (UDM) entity of the HPLMN to the AMF entity of the VPLMN.

12. A terminal in a wireless communication system, the terminal comprising:
 a transceiver; and
 a controller configured to:
  transmit, to an access and mobility management function (AMF) entity of a visited public land mobile network (VPLMN), via the transceiver, a first message, and
  receive, from the AMF entity, via the transceiver, a second message as a response to the first message, the second message including allowed network slice selection assistance information (NSSAI) for the terminal, wherein the allowed NSSAI is transmitted from a network slice selection function (NSSF) entity of the VPLMN to the AMF entity,
 wherein the allowed NSSAI is determined, by the NSSF entity of the VPLMN, without interacting with a home public land mobile network (HPLMN), based on mapping a subscribed NSSAI for the HPLMN of the terminal and NSSAI to be used in the VPLMN of the terminal in case that the HPLMN and the VPLMN have an agreement, and
 wherein the subscribed NSSAI for the HPLMN of the terminal is transmitted from the AMF entity to the NSSF entity of the VPLMN.

13. The terminal of claim 12, wherein the subscribed NSSAI for the HPLMN of the terminal is transmitted from a unified data management (UDM) entity of the HPLMN to the AMF of the VPLMN.

14. The terminal of claim 12, wherein the second message further includes:
 mapping information for the allowed NSSAI.

* * * * *